UNITED STATES PATENT OFFICE.

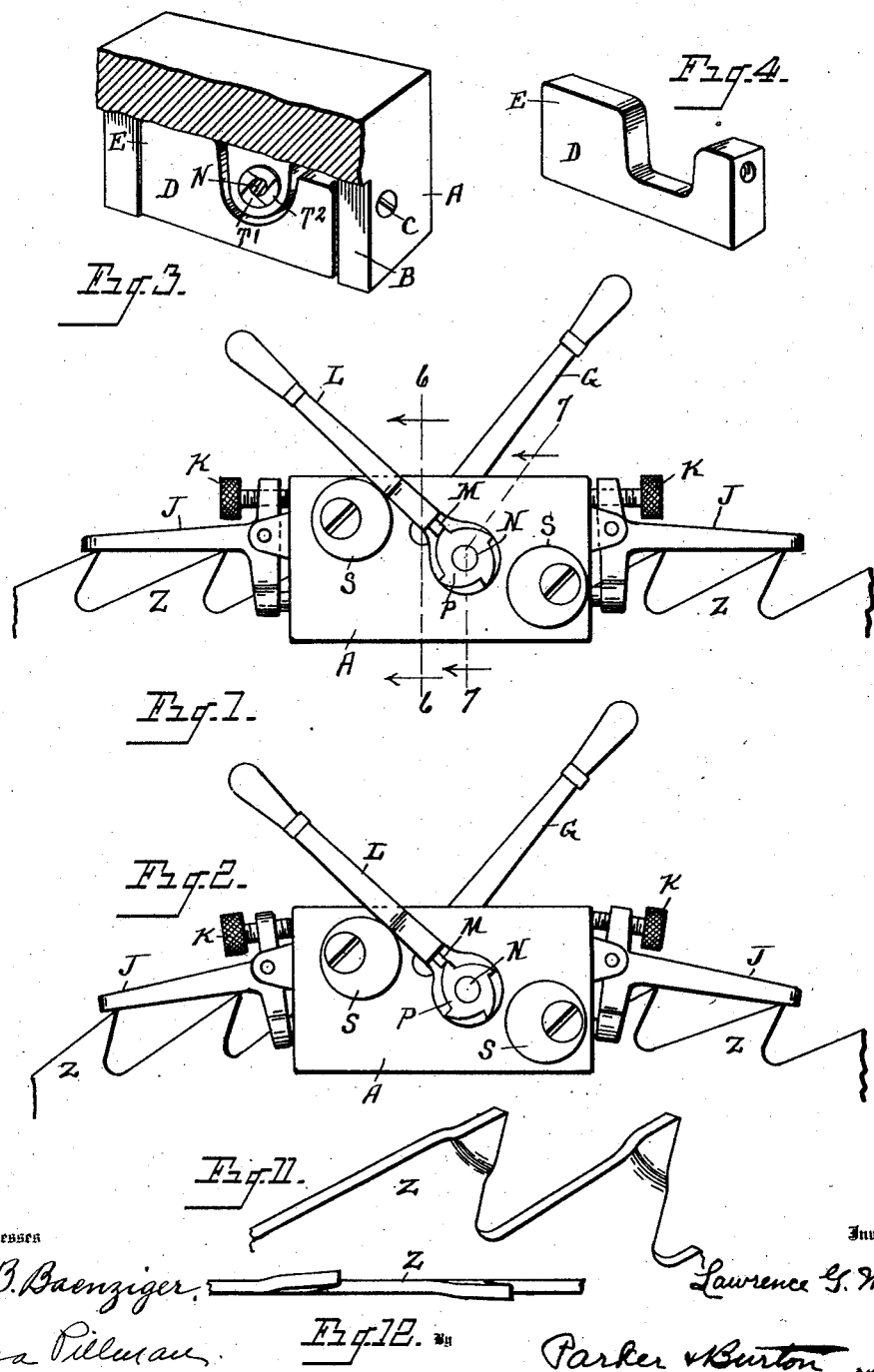

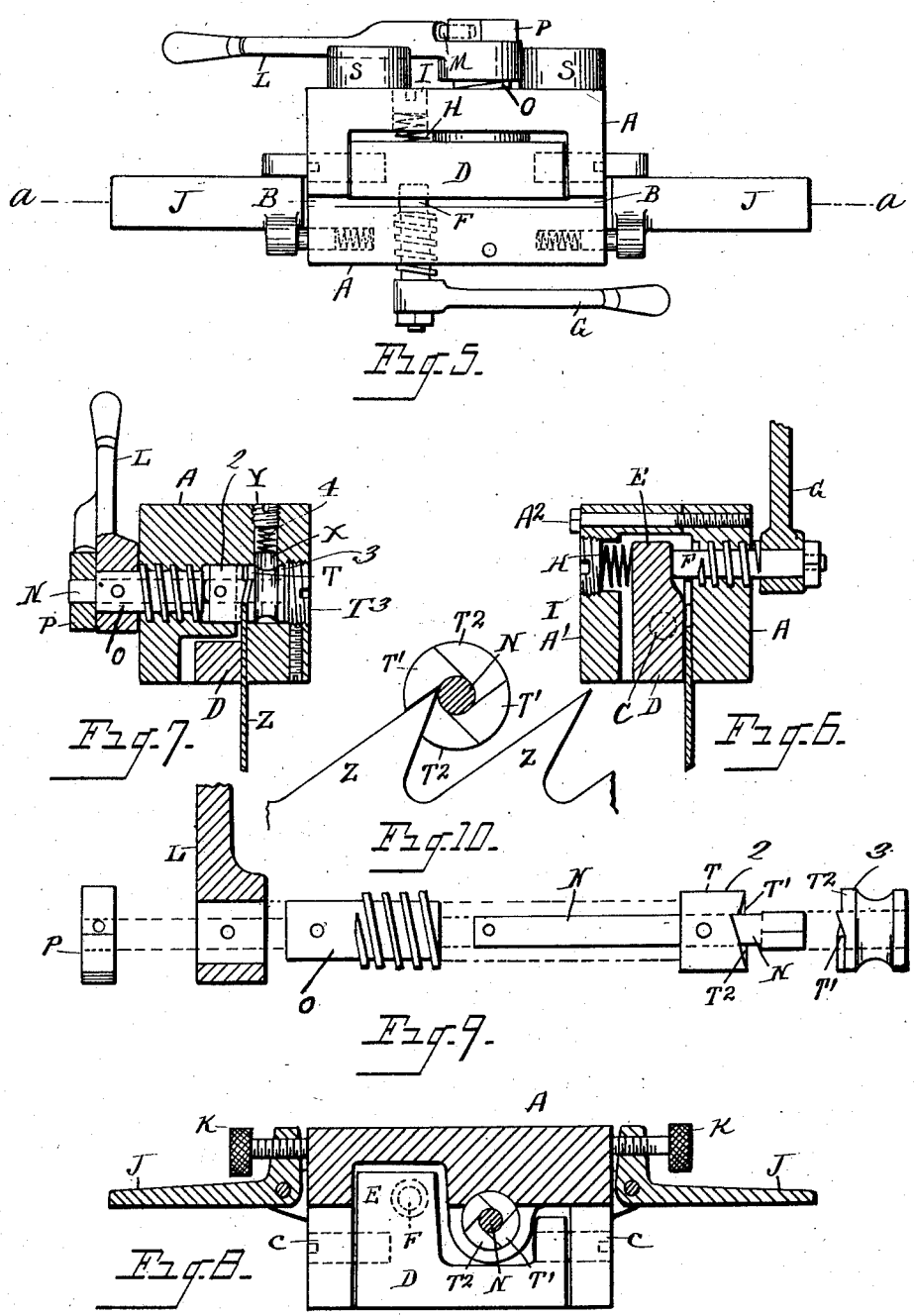

LAWRENCE G. McKAM, OF DETROIT, MICHIGAN, ASSIGNOR TO STANDARD SAW AND MANUFACTURING CO., OF DETROIT, MICHIGAN, A CORPORATION.

SAW-SET.

1,025,950.

Specification of Letters Patent.

Patented May 7, 1912.

Application filed February 14, 1910. Serial No. 543,888.

*To all whom it may concern:*

Be it known that I, LAWRENCE G. Mc-KAM, a citizen of the United States, residing at Detroit, county of Wayne, State of Michigan, have invented a certain new and useful Improvement in Saw-Sets, and declare the following to be a full, clear, and exact description of the same, such as will enable others skilled in the art to which it pertains to make and use the same, reference being had to the accompanying drawings, which form a part of this specification.

This invention relates to saw sets, and has for its object an improved device of this type adapted to be used in setting or distorting the individual teeth to one side or the other of the plane of the saw blade, the direction of distortion being alternating, and the device regulated in adjustment by the operator to change the set from right to left or vice versa.

In the drawings:—Figure 1, is a side elevation of the device applied to a straight band saw. Fig. 2, is a side elevation with the device adjusted for use on a circular saw. Fig. 3, is a perspective of the holding block with one side removed so as to show the relation of the other contained parts to one another and to the block. Fig. 4, is a perspective of the movable holding bit disassociated from the other parts. Fig. 5, is a plan view from beneath. Fig. 6, is a detailed sectional elevation of the inner portion of the holding block, and its actuating shaft and handle. Fig. 7, is a detailed sectional elevation of the rotatable tooth-setting die 2, two of whose four faces have a right hand inclination, and two a left hand inclination. Fig. 8, is a longitudinal sectional elevation along the line *a—a* of Fig. 5. Fig. 9, is an elevation of the various parts of the tooth-setting die disassociated from one another sufficiently to show the specific structural features of it. Fig. 10, is a detail of the forming face of one of the tooth-setting dies, with a saw tooth shown in elevation with respect thereto. Fig. 11, is a fragmentary perspective of the portion of the toothed edge of the saw blade containing one tooth with a right-hand inclination and one with a left. Fig. 12, is a view from above along the toothed edge of the saw blade, showing the relative inclination of the teeth after being operated upon.

A indicates the body block or holding block of the device which may either be in a single piece with a kerf B through the center, or may be in the form of two pieces A and $A^1$ (as shown for example in Fig. 6) united by suitable holding bolts $A^2$. Pivotally supported therein by longitudinally extending pins C is the blade-clamping bit D, which lies in a complementarily recessed portion of the under face of the block, normally in such a position as to narrow but little, if any, the normal breadth of the kerf B. The tail piece E of the holding block D extends so far beyond the point of pivoting toward the interior or rather toward the top of the block, as to be in the way of, and engaged by, the inner end of the actuating screw F, which engages in a threaded bore in the body block A, being actuated by the lever G on the outer end of the screw. The swing of the block under the actuation of the screw F is yieldingly opposed by the spring H, which is held in place by the threaded holding cap I, so that as the screw F is retracted, the block D will, by the pressure of the spring H, be restored to its normal position, that is, in a position which leaves the kerf B of sufficient width to allow the sliding movement of the saw blade therealong. As long, however, as the screw F is in projected position the holding block is held thereby with its lower blade-engaging portion in close engagement against the saw blade which is inserted within the kerf B. The vertical position of the saw set with respect to the toothed edge of the saw blade is regulated by the pivoted brackets J at each end of the body block, which rest upon the teeth of the saw blade, and are adjustable by means of the screws K.

When the blade has been clamped in place by the actuation of the holding block D, the lever L on the opposite side of the block from the lever G is actuated by that hand of the operator which is not engaged in the manipulation of the lever G. The latch M carried by this lever, which is not fixed to the shaft N, engages one of the teeth of the ratchet P which is rigidly attached to the shaft N, so that as the lever is moved about the shaft as a center, the ratchet and consequently the shaft is turned with it.

As shown particularly in Fig. 7, the shaft N is inclosed within the threaded sleeve O, which engages a correspondingly threaded portion of the shaft opening of the body block so that the sleeve, as a whole, is moved slightly in and out with reference to the body block as it is rotated by the lever L. The shaft N is preferably square or hexagonal in cross section on its inner end, so as to engage through the correspondingly cut away central portion of the die member 3, which is mounted upon its inner end. The faces of the die members are complementarily shaped so as to present two right hand and two left hand die faces T¹ and T², arranged in alternating relation, each occupying ninety degrees of the peripheral extent of the die faces, but none of the sections being true segments, since the bounding lines of each section are not truly radial, but are tangential to the periphery of the shaft N, which is of an appreciable diameter with respect to these die members, as shown particularly in Fig. 10. The die member 3, which is on the side of the block farthest removed from the lever L is held from movement lengthwise the shaft N by the spring pressed pin X, which engages in the grooved portion or race (see particularly Figs. 7 and 9). A spring 4 that presses the pin X is held by the threaded cap Y. It is now evident that the squared shaft portion may slide lengthwise through the die member 3 or may rotate it without causing it to move from the plane in which it is held by the pin X. The complementary die member 2 is arranged to be rotated by the movement of the shaft N, to which it is fast. It is rotated a quarter turn at each swing of the lever L, when in engagement with the ratchet P. This movement of the lever L withdraws the sleeve O which pulls out the shaft N by pushing against the ratchet P that is fast to the shaft N and hence the die member 2 is pulled away from the die member 3. The reverse movement of the lever L,—or the movement in which the latch member passes over the ratchet teeth—projects the threaded sleeve O inward and it encounters the rear face of the die member 2 and pushes it firmly against the saw tooth and the latter against the die member 3.

In the unactuated position of the device the space normally remaining between the opposing faces of the die members 2 and 3 lies in substantially the same plane as that of the kerf B, so that as the saw blade is inserted therein, the teeth will extend up to the position between the die faces indicated in Fig. 10. The swing of the lever causing the entering movement of the threaded sleeve O forces the die face of the die member 2 against the saw tooth, and the tooth against the die face of the die member 3, which is of corresponding shape. That is, if the die face T¹ of the die member 2 be the present active one, the saw tooth as it is forced laterally by the movement of the die member encounters a die face T² of the opposite inclination on the member 3. The tooth having been given its desired set, the swing of the lever L in the opposite direction not only retracts the threaded sleeve O, and pulls the die member 2 away from the die member 3 by the threaded sleeve O engaging against the ratchet P which is fast to the shaft N, to which the die member 2 is fast, but as well turns the shaft N through another quarter turn, since the swing of the lever L which resulted in the inward projection of the sleeve O has brought its latch member to such a position that it can catch another tooth of the ratchet. Since by this die-rotating stroke of the lever L both parts 2 and 3 of the die member are turned accordingly through practically a ninety degree angle, the active faces of each now swung into position to engage the next saw tooth are inclined in the opposite direction from their predecessors, that is the active face of the die member 2 is of the type T² while the active face of the die member 3 is of the type T¹. This alternating arrangement makes it possible to set all the teeth of a saw consecutively without setting the first, third, fifth and etc. and subsequently going over the entire length of the blade again in order to set the second, fourth, sixth and etc. after the die has been laboriously changed from a right hand to a left hand set.

What I claim is:—

1. In a saw set, the combination of a kerfed body block, means for holding a saw blade clamped therein, die members having alternating right and left faces rotatably journaled in said body block transversely of the kerf therein, and means for causing the periodical rotation thereof and for periodically projecting one of the die members lengthwise of its axis, substantially as described.

2. A saw set, having in combination a body block, a pair of die members provided with alternating right and left face portions, journaled therein, means for compressing said dies together and for withdrawing them from such compressed relation and means operating each time the dies are withdrawn for bringing a different set of face portions into position, whereby the teeth of a saw may be set consecutively, substantially as described.

3. A saw set, having in combination, a body block, a die member having alternating right and left face portions, and held in said block to rotate, but held from transverse movement, a shaft capable of rotating said die and slidable thereinto lengthwise itself, a second die having alternating right and left face portions complementarily arranged with the face portions of the other die member, rotatably connected with said shaft, and also slidable in the cavity of the block, means for causing said second die to approach and withdraw from said first die, and means by which said shaft may be turned to change the setting faces of said dies, substantially as described.

4. A saw set, having in combination, a body block, a die member having alternating right and left face portions and provided with a peripheral groove or race, a spring-pressed pin held in said body block and engaging in said peripheral groove to prevent transverse movement of said die, a shaft capable of rotating said die and slidable therein lengthwise itself, a second die member having alternating right and left face portions complementarily arranged with the face portions of the other die member, the said second die member being rotatably connected with the said shaft and slidable in the cavity of the block, means for causing said second die member to approach and withdraw from said first die member, and means by which said shaft may be turned to change the active face portions of said dies, substantially as described.

5. A saw set, having in combination, a body block, a die member having alternating right and left face portions and held in said block to rotate, but held from transverse sliding, a shaft squared into said die member, a second die member having alternating right and left face portions complementarily arranged with the face portions of said first die member, the said second die member being fast on said shaft, means for sliding said shaft back and forth in its cavity, and means by which said shaft may be turned to change the active face portions of the die members, substantially as described.

6. A saw set, having in combination, a body block, a die member having alternating right and left face portions and held in said block to rotate, but held from transverse sliding, a shaft squared into said die member, a second die member having alternating right and left face portions complementarily arranged with the face portions of said first die member, said second die member being rotatably connected with said shaft, a lever for turning said shaft by swinging in one direction and means operated by said lever for forcing said second die against the first die when the lever is swung in one direction and for withdrawing said second die when the lever swings in the opposite direction and turns said shaft, substantially as described.

7. A saw set, having in combination, a body block, a die member having alternating right and left face portions and held in said block to rotate, but held from transverse movement, a shaft squared into said die member, a second die member having alternating right and left face portions complementarily arranged with said face portions of the first die member, the said second die member being rotatably connected with said shaft, a lever for turning said shaft by swinging in one direction, a threaded sleeve engaging in the threaded cavity of the body block about said shaft and fast to said lever and having thrust connections with said second die member, whereby swinging of the lever in one direction thrusts the second die into the first die and swinging of the lever in the opposite direction withdraws the dies and rotates them to bring other face portions into position, substantially as described.

8. A saw set, having in combination, a body block, a die member having alternating right and left face portions, and held in said block to rotate, but held from transverse sliding, a shaft squared into said die member, a second die member having alternating right and left face portions complementarily arranged with said face portions of the first die member, the said second die member being fast to said shaft, a ratchet wheel on the end of said shaft, a threaded sleeve engaging in the threaded cavity of the body block surrounding said shaft and a lever provided with a latch engaging said ratchet wheel said lever being fast to said sleeve, whereby oscillation of the lever forces the second die against the first die and a return oscillation withdraws the second die and turns the dies to bring into position different face portions, substantially as described.

In testimony whereof, I sign this specification in the presence of two witnesses.

LAWRENCE G. McKAM.

Witnesses:
CHARLES F. BURTON,
VIRGINIA C. SPRATT.